United States Patent [19]

Hénaff

[11] Patent Number: 4,713,805

[45] Date of Patent: Dec. 15, 1987

[54] METHOD AND DEVICE FOR SELECTING ONE STATION FROM A SET OF STATIONS DIALOGING WITH A MAIN STATION

[75] Inventor: Bernard Hénaff, Ploubezre, France

[73] Assignee: Compagnie Industrielle des Telecommunications Cit-Alcatel, Paris, France

[21] Appl. No.: 652,390

[22] Filed: Sep. 20, 1984

[30] Foreign Application Priority Data

Sep. 27, 1983 [FR] France .................................. 83 15294

[51] Int. Cl.[4] .......................... H04J 3/02; H04Q 19/00
[52] U.S. Cl. ......................................... 370/85; 370/89; 370/95; 340/825.5
[58] Field of Search ...................... 370/85, 89, 67, 95, 370/96, 90; 340/825.5

[56] References Cited

U.S. PATENT DOCUMENTS 3,978,451  8/1976  Ito et al. .
4,199,662  4/1980  Lowe .
4,539,679 10/1985  Bux et al. ........................ 340/825.5
4,550,402 10/1985  Gable et al. ........................... 370/85
4,567,589  1/1986  Lecomte et al. ...................... 370/67

FOREIGN PATENT DOCUMENTS 0052956  2/1982  European Pat. Off. .
58-149531 9/1983  Japan ................................ 340/825.5

OTHER PUBLICATIONS

IBM Technical Disclosure Bulletin, vol. 18, No. 2, Sep. 1974, N.Y. U.S., J. L. Dellheim et al.: "Polling Method Using Subgroups of Polled Stations", p. 1131, a whole.
Electronic Engineering, vol. 50, No. 606, May 1978, Londres (GB) C. Moller: "A Simple Data Bus for Low Data Rates", pp. 41–43, p. 41 right column, line 26–p. 43, left column, line 20.
Electrical Communication, vol. 56, No. 1, 1981 New York U.S., E. A. Smith et al: "Impact of Non-Voice Services on Network Evolution", pp. 17–30—p. 26, FIGS. 3, 4.

Primary Examiner—Douglas W. Olms
Assistant Examiner—Curtis Kuntz
Attorney, Agent, or Firm—Sughrue, Mion, Zinn, Macpeak, and Seas

[57] ABSTRACT

In a method of selecting one station from a set of stations dialoging with a main station, the main station consults groups of stations one at a time, sending a consultation message to each group consulted. Within each group, stations having information to transmit request reservation of a multiplex link time slot connecting the group to the main station. Each station having information to transmit makes this request after a time delay which depends on the address of the station within the group has elapsed since reception of a synchronization signal. When the main station consults a group, only the station which has reserved this multiplex link can send over the link. In a system implementing this method, each group of stations comprises a self-assigned bus and a synchronization signal link. Each station comprises an assignment system connected to the self-assignment bus and to a microproccessor in the station.

5 Claims, 5 Drawing Figures

METHOD AND DEVICE FOR SELECTING ONE STATION FROM A SET OF STATIONS DIALOGING WITH A MAIN STATION

BACKGROUND OF THE INVENTION

1. Field of the Invention

The invention concerns the selection of one station from a set of stations dialoging with a main station to which they are connected by a multiplex link consisting of at least one multiplex line for each communication direction, the dialog consisting in an exchange of messages transmitted in a reserved time slot of each frame of the multiplex line which carries information in coded pulse form contained in the time slots of a frame. As a rule, the frame has duration of 125 microseconds and is divided into 32 time intervals referred to as time slots.

2. Description of the Prior Art

In a centralized type communication network, the stations are terminal units connected to a certain number of subscriber lines and to a control unit equipped with a main station which consults said stations, this control unit being itself connected to the telecommunication exchange by a multiplex link.

The stations dialog with the main station by means of a reserved time slot in the frames of the multiplex lines, and the time slot reserved for dialog with the main station may be any of the 32 time slots of the frame. It is not possible for more than one station to dialog with the main station at a time. It is therefore necessary for the stations to share the reserved time slot and to use it in turn.

There are two methods for dynamic sharing of a reserved time slot, the competitive method and the elective method.

In the competitive method of dynamic sharing each station sends its messages at will without making any request beforehand and without concerning itself with the other stations. The major disadvantage consists in the resulting collision of messages, which are thus degraded. This phenomenon entails the need for repetitions which increase with the load and the number of stations, resulting in a lack of efficiency through a severe limitation on the bit rate. To partially eliminate such collisions, while retaining the competitive principle, use is made either of discrete time intervals, whereby each sending station must wait for the beginning of a particular time interval in order to send a message, or the listening method which is based on two mechanisms: detection of a free time slot (listen before send) and detection of collisions (listen during send). These two solutions require additional hardware and software at each station and make it difficult to monitor the activity of each station.

In the elective method, a station may be elected either by consultation or by centralized selection. In the consultation method, all stations are interrogated in a fixed order. When a station which is ready to send is encountered, it is elected and the consultation stops. Once the message has been sent consultation resumes. Disadvantages of this method include a scanning time which increases with the number of stations and a service order which bears no relationship to the order of requests for service.

In the centralized election method an arbiter stores requests from the various stations and carries out the election. Disadvantages of this method consist in the complexity of the arbiter and in the fact that the requests are themselves messages which must be sent in a dedicated time slot.

The object of the invention is to select a station in a way which, by comparison with the prior art methods, makes possible a significant saving in terms of hardware in each station while retaining good communication performance, that is to say by limiting the effect of the number of stations on the bit rate and by taking into account the order of requests.

SUMMARY OF THE INVENTION

In one aspect, the invention consists in a method of selecting one station from a plurality of groups of stations dialoging with a main station over transmit multiplex links carrying messages sent by the stations and receive multiplex links carrying messages sent by the main station, said transmit and receive multiplex links each comprising at least one multiplex line having a time slot in a repetitive frame reserved for dialog, the stations each being connected to the main group of station by a transmit multiplex link and a receive multiplex link, wherein the stations in each group receive a synchronization signal, each station in each group which has information to send in the reserved time slot of the transmit multiplex link sends a request within the group to reserve this time slot after a time delay depending on its address within the group has elapsed since reception of the synchronization signal, the main station consults each group of stations in succession by sending a consultation message to all stations in the group, and the station in the consulted group which has reserved the reserved time slot sends its message as soon as it receives the consultation message.

In another aspect, the invention consists in a system adapted to implement a method of selecting one station from a plurality of groups of stations dialoging with a main station over transmit multiplex links carying messages sent by the stations and receive multiplex links carrying messages sent by the main station, said transmit and receive multiplex links each comprising at least one multiplex line having a time slot in a repetitive frame reserved for dialog, the groups of stations each being connected to the main station by a transmit multiplex link and a receive multiplex link, wherein the stations in each group receive a synchronization signal, each station in each group which has information to send in the reserved time slot of the transmit multiplex link sends a request within the group to reserve this time slot after a time delay depending on its address within the group has elapsed since reception of the synchronization signal, the main stations consults each group of stations in succession by sending a consultation message to all stations in the group, and the station in the consulted group which as reserved the reserved time slot sends its message as soon as it receives the consultation message, wherein each group comprises a self-assigned bus and a clock signal link connected to the stations and wherein each station comprises a microprocessor and an assignment system connected to said self-assigned bus and to said microprocessor.

Thus, in accordance with the invention, a station is selected by means of a comprise between the elective and competitive methods. This compromise is based on the fact that the stations are formed into groups which are connected to the main station and that the bit rate of information exchanged with the main station is low. The grouping of the stations makes it possible to implement, within each group, a simple system for sharing the time slot for communication between the stations of the group. The low bit rate of the information provides, in the main station, for the sharing of the communication equipment between a number of groups. The invention thus makes it possible to combine the advantages of distributed selection of a station within a group, by competition within the group, with the advantages of the selection of a group by the main station, this being achieved with limited hardware.

As the equipment of the main station is shared by all the stations in the groups, the invention also provides for a saving in terms of the equipment in the main station.

Other objects and advantages will appear from the following description of an example of the invention, when considered in connection with the accompanying drawings, and the novel features will be particularly pointed out in the appended claims.

DESCRIPTION OF THE PREFERED EMBODIMENT

Figure 1:
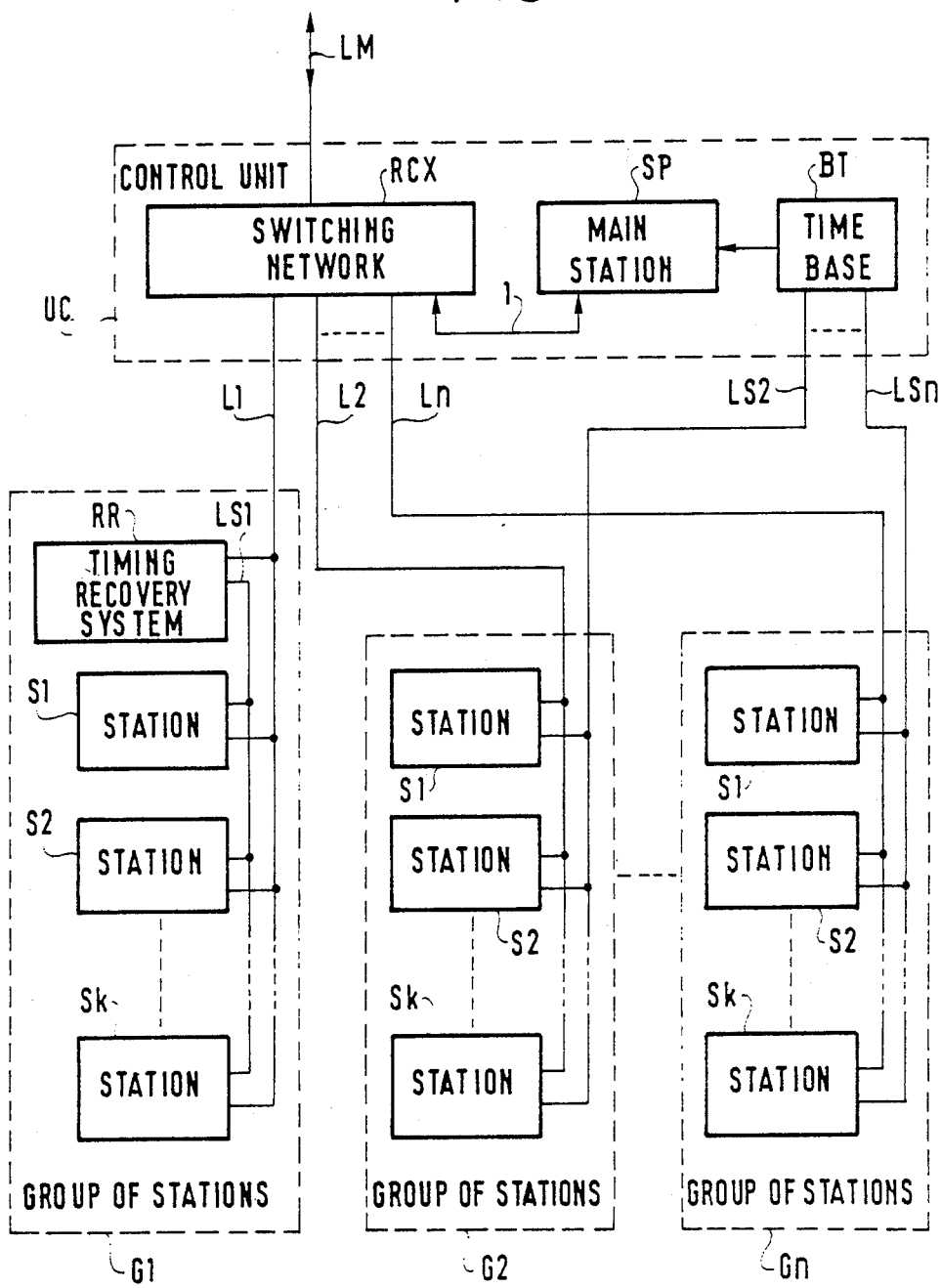
FIG. 1 is a schematic block diagram of a communication network to which the invention is applied.

In FIG. 1, which is a schematic block diagram of a communication network to which the invention is applied, groups of stations G1, G2, ..., Gn are connected to a control unit UC by respective two-way multiplex links L1, L2, ..., Ln. Each group consists of stations S1, S2, ..., Sk connected in parallel to the multiplex link which connects the group to the control unit. Each station is connected to subscriber lines, each group constituting a concentrator. Group G1 is a remote concentrator, for example, and groups G2 to Gn are local concentrators, that is to say they are near the control unit. Because of its remote location, the group G1 comprises a timing recovery system RR connected to the multiplex link L1 and distributing recovered clock signals and a synchronization signal to stations S1 and Sk over a clock signal link LS1. The control unit UC comprises a switching network RCX, a main station SP and a timebase BT. The switching network is connected to the groups by multiplex links L1, L2, ..., Ln and to the exchange by a two-way multiplex link Ln consisting of a plurality of multiplex lines. The main station SP is connected to the switching network by a two-way multiplex link 1 providing for the exchange of messages with the stations of the groups. The timebase BT delivers the clock and synchronization signals necessary to the functioning of the control unit and the local groups G2 to Gn. It is therefore connected to the groups G2 to Gn by clock signal links LS2 to LSn, respectively. It will be understood that the communication network may comprise more than one remote group or none at all.

The exchange of messages between the main station and each group of stations is effected through the intermediary of a reserved time slot of the multiplex link connecting the group to the main station, more precisely on each of the multiplex lines of the multiplex link, the bit rate of the reserved time slot being 64 kbit/s. Messages are exchanged in this reserved time slot using an HDLC type protocol defined by the CCITT. The selection of a station within a group is effected by competition within the group, the station thus selected transmitting as soon as it receives the consultation message sent to the group by the main station, this message being sent to all the stations of the group. Exchanges in the reserved time slot are in half-duplex mode and according to a master-slave principle whereby the main station consults the stations by distributing a consultation frame to the groups in turn.

Figure 2:
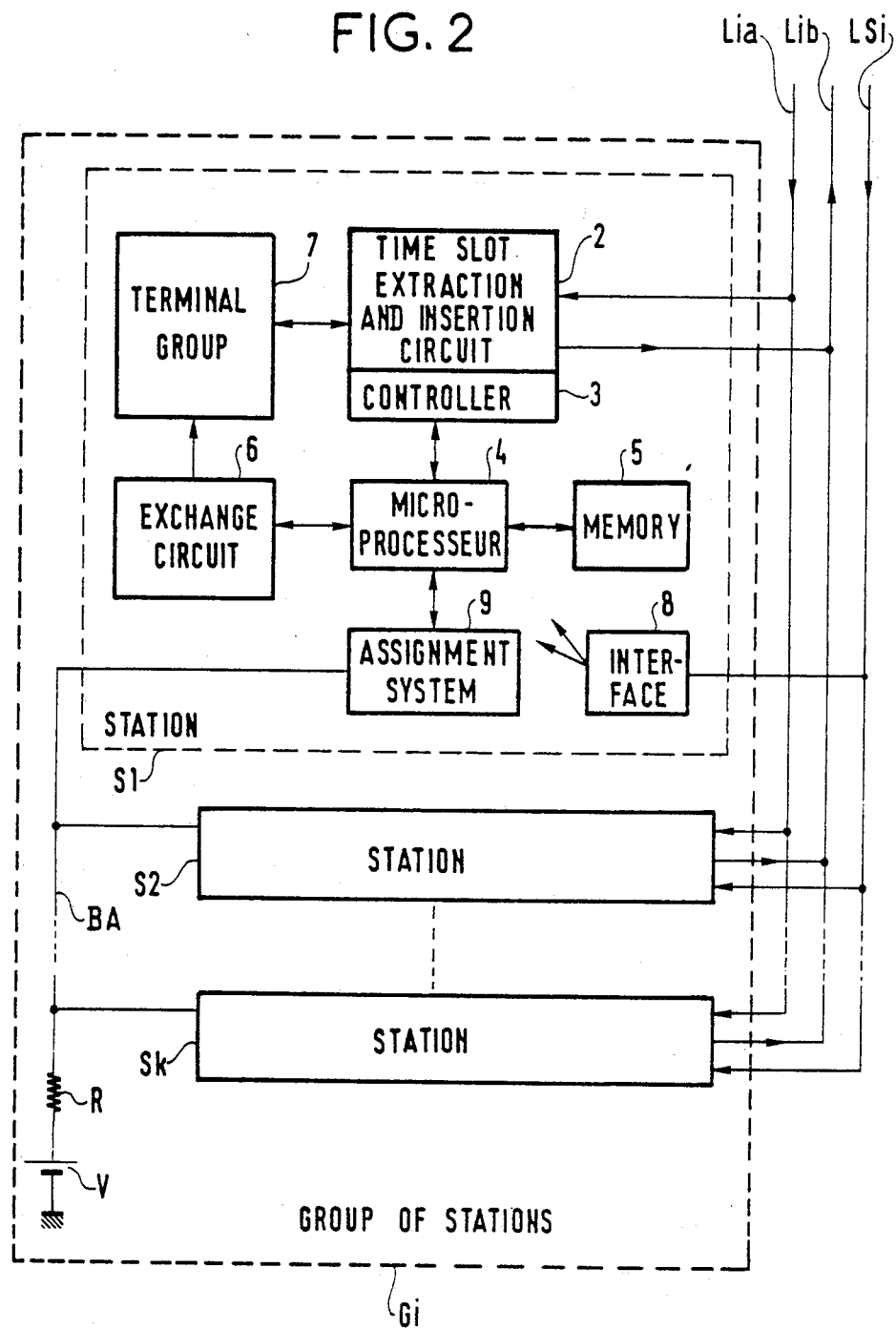
FIG. 2 shows a group of stations from FIG. 1 and the system in accordance with the invention.

FIG. 2 shows a group Gi of stations from FIG. 1, each group comprising a system in accordance with the invention for selecting one station within the group. Each station, which may be, for example, of the type described in U.S. Pat. No. 4,499,575 entitled "Group of Terminal Units for a Digital Exchange," comprises a time slot extraction and insertion circuit 2, a controller 3 consisting of a transmit-receive circuit using the HDLC protocol, a microprocessor 4, a memory 5, an exchange circuit 6, a terminal group 7 and an interface circuit 8 connected to the clock signal link LFi, this interface circuit distributing the clock and synchronization signals to the various units of the station. The time slot extraction and insertion circuit 2 is connected to receive multiplex links Lia and transmit multiplex links Lib which constitute a multiplex link Li connecting the station to the control unit, each receive and transmit multiplex link comprising a number of multiplexed lines, between one and four, for example. In accordance with the invention, each of stations S1 to Sk comprises as assignment system 9 connected to a self-assigned bus BA common to all the stations S1 to Sk of the group Gi of stations. The self-assigned bus BA is connected via a resistor R to the positive polarity of a voltage source V the negative polarity of which is grounded. In each station the assignment system 9 is connected to the microprocessor 4.

Figure 3:
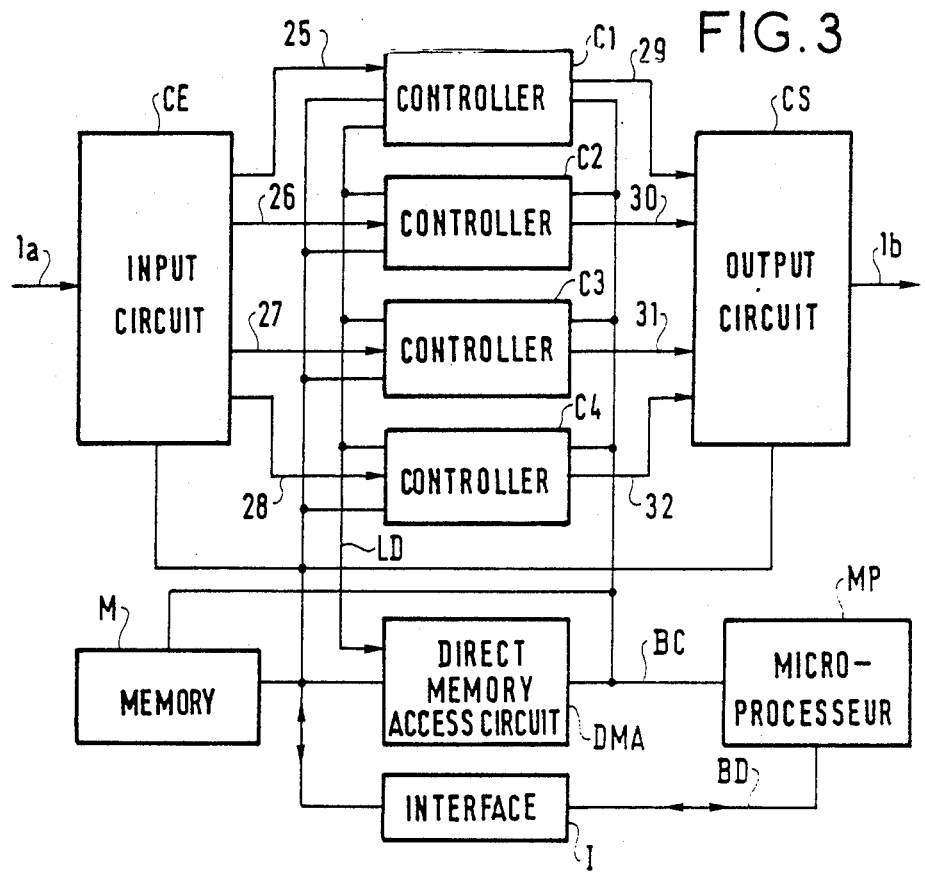
FIG. 3 is a schematic diagram of the main station from FIG. 1.

FIG. 3 shows, by way of example, the schematic diagram of the main station SP of the control unit UC in FIG. 1. An input circuit CE is connected by an incoming multiplex link 1a to the switching network RCX of the control unit UC and an output circuit CS is connected by an outgoing multiplex link 1b to the switching network RCX of the control unit UC. The incoming multiplex link 1a and the outgoing multiplex link 1b constitute the two-way multiplex link 1 of FIG. 1.

Four serial communication controllers C1 to C4, which may be, for example, of the 8530 type marketed by AMD, have their inputs connected by four respective incoming multiplex lines 25, 26, 27, 28 to the input circuit CE. Their outputs are connected by four respective outgoing multiplex lines 29, 30, 31, 32 to the output circuit CS.

The main station further comprises a direct memory access circuit DMA, a memory M, a microprocessor MP and an interface circuit I. The microprocessor MP is connected by a data bus BD and via the interface circuit I to the memory M, to the direct memory access circuit DMA, the the controllers C1 to C4, to the input circuit CE and to the output circuit CS. The microprocessor MP is also connected by a control bus DC to the controllers C1 to C4, to the direct memory access circuit DMA and to the memory M. Each controler is also connected to the direct memory access circuit DMA by a request link LD.

The incoming multiplex link 1a consists of a number of multiplex lines and the input circuit CE implements space-division and time-division switching between these multiplex lines and the incoming multiplex lines 25 to 28. Similarly, the outgoing multiplex link 1d consists of a number of multiplex lines and the output circuit CS implements space-division and time-division switching between the outgoing multiplex lines 29 to 32 and the multiplex lines of the outgoing multiplex link 1b.

Messages received from a station over the incoming multiplex link 1a are processed in one of the controllers C1 to C4 and the messages for a group or a station are porcessed by one of the controllers C1 to C4 and sent over the outgoing multiplex link 1b.

Figure 4:
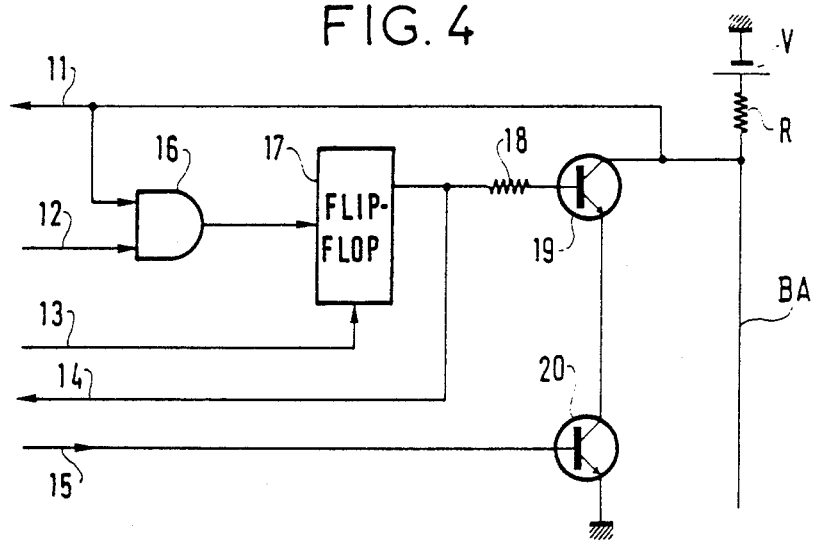
FIG. 4 shows a system for assigning the stations from FIG. 3.

FIG. 4 shows the assignment system 9 of FIG. 2 provided in each station and comprising an AND gate 16, a flip-flop 17, and resistor 18 and two transistors 19 and 20. The AND gate 16 has its output connected to the input of the flip-flop 17, which is a type D flip-flop with its output connected via the resistor 18 to the base of the transistor 19. The transistor 19 has its collector connected to the self-assigned bus BA and its emitter connected to the collector of the transistor 20, the emitter of which is connected to ground. The collector of the transistor 19 is also connected to one input of the AND gate 16 and, via a bus status line 11, to the microprocessor of the station which is also connected as follows: by a request line 12 to another input of the AND gate 16, by a release line 13 to a reset input of the flip-flop 17, by a status line 15 to the output of the flip-flop 17 and by a disable line 15 to the base of the transistor 20.

Figure 5:
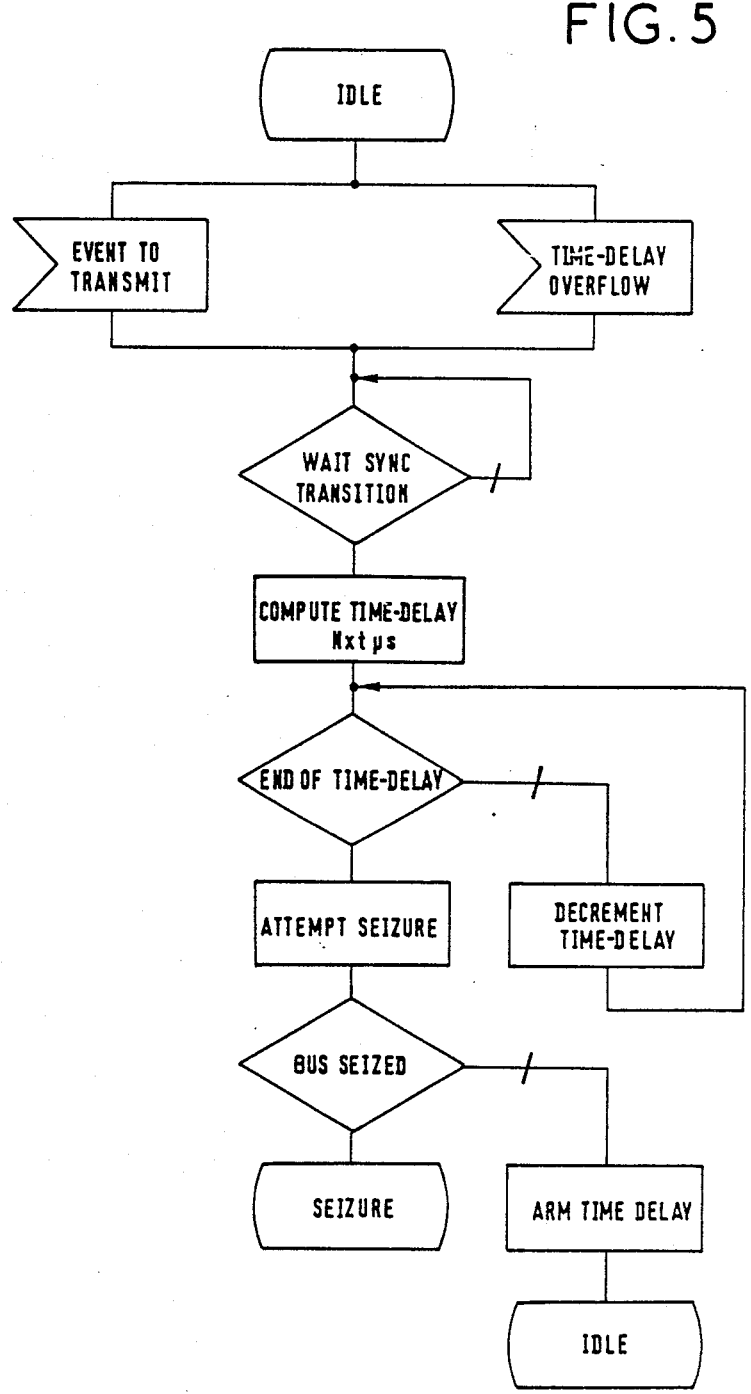
FIG. 5 is a flowchart of the algorithm executed by each station to assign itself the reserved time slot.

When a station Si of the group Gi requires to reserve the reserved time slot of the transmit multiplex link, its microprocessor 4 runs the algorithm shown in FIG. 5 to attempt to seize the self-assigned bus by sending a signal on the request line 12 to the AND gate 16. This receives on one input a bus status signal with the value 1 if the self-assigned bus BA is free and the value 0 if the bus is busy. If another station has seized the bus, the AND gate is disabled and the request is blocked at the AND gate. If the bus is free, the AND gate delivers a signal to the flip-flop 17 which changes state and applies a signal to the base of the transistor 19 to cause it to conduct. The transistor 20 normally receives over the disable line 15 a control signal which renders it conductive. In the event of internal failure of the station the base of the transistor 20 receives a signal which cuts off the transistor 20 which in turn cuts off the transistor 19 since the two transistors are connected in series. Thus when the station has not failed the transistor 20 is conducting and when the transistor 19 is conducting, the self-assigned bus BA is virtually grounded through the collector-emitter junctions of the transistors 19 and 20. With the self-assigned bus thus grounded, no other station of the group can seize the self-assigned bus since the AND gate 16 of its assignment system is disabled. In the station which has seized the self-assigned bus the bus status is transmitted over the bus status line 11 to the microprocessor which registers the change of state of the bus and which also receives over the status line 14 the status of the flip-flop 17. This is to confirm that the change of state of the bus results correctly from the change of state of the flip-flop and thus from the seizure request sent over the request line 12.

With the microprocessor thus advised of the change of state of the self-assigned bus resulting from the seizure request, it commands transmission of the message over the transmit multiplex link Lib which connects the group to the main station as soon as it receives a consultation message from the main station over the receive multiplex link Lia. Within the group, the consultation message is sent to all stations since these are connected to the receive multiplex link Lia, but only the station which has seized the self-assigned bus BA sends a message over the transmit multiplex link Lib, in the reserved time slot of the frame of this multiplex link. At the end of messages exchanged with the main station, the microprocessor delivers over the release line 13 a release signal which resets the flip-flop 17 to 0, which in turn releases the self-assigned bus BA.

The function of the algorithm shown in FIG. 5 is to assign each station a particular time slot within a frame of 125 microseconds, depending on the address of the station within the group to make a request to seize the self-assigned bus at the end of this time. The frame is delimited by the synchronization signal carried by the clock signal links LS1 to LSn. This time assigned to each station eliminates conflicts between the stations of a group by providing for separation of attempts by the group to seize the self-assigned bus BA. When a station wishes to send a message, the microprocessor runs the algorithm which begins with a wait for the synchronization signal to change state. The first transition of the latter signal arms a time-delay initialized to N.t microseconds, where N is the address of the station within the group and t has a minimum value of 3 microseconds, required by virtue of the uncertainty introduced by the excecution by the microprocessor of the wait loop for the synchronization signal transition. At the end of the time-delay a request to seize the self-assigned bus is made and the result (bus seized by the station or not) is verified (state of the bistable 17 transmitted by the status line 14 and state of the bus transmitted by the bus status line 11). If the bus has been seized by the station, following the latter's request, the transmit multiplex link Lib is assigned to the station which sends its message as soon as it receives the group consultation message sent by the main station. Within the group the consultation message is distributed to all the stations, but only the station which has seized the bus can send since, in the other stations, the seizure request will have given a negative result, the microprocessor in each of these stations having been advised, over the bus status line 11 and the status line 14, of the failure of the request to seize the self-assigned bus. When the result of a request to seize the self-assigned bus is negative, a second time-delay is armed and at the end of this second time-delay the process described above is repeated (wait for synchronization signal transition, etc . . . ).

It will be understood that various changes in the details, materials and arrangements of parts, which have been herein described and illustrated in order to explain the nature of the invention, may be made by those skilled in the art within the principle and the scope of the invention as expressed in the appended claims.

I claim:

1. A method of selecting one station from a plurality of groups of stations dialoging with a main station over transmit multiplex links carrying messages sent by the stations and receive multiplex links carrying messages sent by the main station, said transmit and receive multiplex links each comprising at least one multiplex line having a time slot in a repetitive frame reserved for dialog, each of said groups being connected to the main station by a transmit multiplex link and a receive multiplex link, wherein the stations in each group receive a synchronization signal, each station in each group which has information to send in the reserved time slot of the transmit multiplexed link sends a request within the group for reservation of this reserved time slot after a time delay, whose length depends on an address of the station within the group, has elapsed since reception of the synchronization signal, the main station consults each group of stations in succession by sending a consultation message to all stations in the group, and the station in the consulted group which has reserved the reserved time slot sends its message as soon as it receives the consultation message.

2. A system adapted to implement a method of selecting one station from a plurality of groups of stations dialoging with a main station over transmit multiplex links carrying messages sent by the stations and receive multiplex links carrying messages sent by the main station, said transmit and receive multiplex links each comprising at least one multiplex line having a time slot in a repetitive frame reserved for dialog, each of said groups being connected to the main station by a transmit multiplex link and a receive multiplex link, wherein the stations in each group receive a synchronization signal, each station in each group which has information to send in the reserved time slot of the transmit multiplexed link sends a request within the group for reservation of this reserved time slot after a time delay, whose length depends on an address of the station within the group, has elapsed since reception of the synchronization signal, the main station consults each group of stations in succession by sending a consultation message to all stations in the group, and the station in the consulted group which has reserved the reserved time slot sends its message as soon as it receives the consultation message, wherein each group comprises a self-assigned bus and a clock signal link connected to the stations and wherein each station comprises a microprocessor and an assignment system connected to said self-assigned bus and to said microprocessor, wherein a station having information to send accesses said self-assigned bus and excludes other stations.

3. A system according to claim 2, comprising a direct current power supply having one polarity of its output grounded, a resistor via which said self-assigned bus is connected to the other polarity of said output of said power supply, a bus status line, a request line, a release line, a status line and a disable line, and wherein said assignment system comprises an AND gate, a flip-flop, series-connected first and second transistors and a resistor, and the output of said AND gate is connected to the input of said flip-flop the output of which is connected via said resistor to the base of said first transistor, the self-assigned bus is connected to the collector of said first transistor and to an input of said AND gate, said microprocessor is connected by said bus status line to said self-assigned bus, by said request line to another input of said AND gate, by said release line to a reset input of said flip-flop, by said status line to the output of said flip-flop and by said disable line to the base of said second transistor.

4. A system according to claim 2, wherein said main station is adapted to be connected to local groups and further comprising a timebase and a clock signal link adapted to connect said timebase, which is adapted to control said main station, to each of said local groups.

5. A system according to claim 2, wherein said main station is adapted to be connected to remote groups and further comprising a timing signal recovery system in each remote group and a clock signal link adapted to connect said timing signal recovery system to the stations of said group.

* * * * *